(12) United States Patent
Wu et al.

(10) Patent No.: US 11,543,558 B1
(45) Date of Patent: Jan. 3, 2023

(54) ORIENTATION DETERMINATION AND CALIBRATION OF ELECTROMAGNETIC RESISTIVITY TOOLS

(71) Applicant: Halliburton Energy Services, Inc., Houston, TX (US)

(72) Inventors: Hsu-Hsiang Wu, Sugarland, TX (US); Yi Jing Fan, Singapore (SG); Weixin Dong, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/510,123

(22) Filed: Oct. 25, 2021

(51) Int. Cl.
  *G01V 3/38* (2006.01)
  *H04B 17/12* (2015.01)
  *G01V 3/26* (2006.01)

(52) U.S. Cl.
  CPC .................. *G01V 3/38* (2013.01); *G01V 3/26* (2013.01); *H04B 17/12* (2015.01)

(58) Field of Classification Search
  None
  See application file for complete search history.

(56) References Cited

U.S. PATENT DOCUMENTS

| 9,547,102 | B2 * | 1/2017 | Wu | ........................... | G01V 3/38 |
| 10,358,911 | B2 * | 7/2019 | Wu | ........................... | G01V 3/28 |
| 2015/0301222 | A1 * | 10/2015 | Davydychev | ............ | G01V 3/30 |
| | | | | | 324/338 |
| 2015/0322774 | A1 * | 11/2015 | Wu | ........................ | G01B 7/004 |
| | | | | | 702/7 |
| 2015/0369950 | A1 * | 12/2015 | Wu | .......................... | G01V 3/30 |
| | | | | | 702/7 |
| 2018/0239048 | A1 | 8/2018 | Wu et al. | | |
| 2019/0079210 | A1 * | 3/2019 | Ma | .......................... | G01V 1/50 |

FOREIGN PATENT DOCUMENTS

| WO | 2011129828 | 10/2011 | |
| WO | 2014098919 | 6/2014 | |
| WO | WO-2020101709 A1 * | 5/2020 | ............. E21B 49/00 |

* cited by examiner

*Primary Examiner* — Lina M Cordero
(74) *Attorney, Agent, or Firm* — Benjamin Ford; C. Tumey Law Group PLLC

(57) ABSTRACT

Systems and methods of the present disclosure relate to calibration of a resistivity tool. A calibration method comprises deploying a transmitter in a known formation with a known resistivity property with a physical tilted angle θ relative to a longitudinal axis of the tool; deploying receivers in the known formation, wherein a physical tilted angle of a first receiver is θ relative to the longitudinal axis of the tool, and wherein a physical tilted angle of a second receiver is –θ, relative to the longitudinal axis of the tool; transmitting signals with the transmitter and measuring the signals at the receivers; combining measurements at two receivers with respect to a transmitter signal in the known formation; producing synthetic responses of the tool in the known formation using forward modeling; and calculating an effective tilted angle θ' from real measurements and the synthetic responses.

20 Claims, 5 Drawing Sheets

ORIENTATION DETERMINATION AND CALIBRATION OF ELECTROMAGNETIC RESISTIVITY TOOLS

BACKGROUND

Tilted electromagnetic (EM) antennae have been widely used in formation resistivity determinations and geo-steering applications due to their azimuthal sensitivity and mechanical design, such as in antennae tilted at 45 degrees. However, ferrites used to improve the efficiency of the antennae, and a conductive mandrel of a bottom hole assembly (BHA) that is underneath the tilted antennae, may affect actual orientation (e.g., effective tilted orientation) for propagating signals into the formation. Therefore, determination of the actual orientation may be desired to reduce errors in multi-component signals which may result in incorrect formation resistivity determinations and incorrect geo-steering of a tool.

Typically, modeling simulations on actual mechanical drawings may be used to determine the effective tilt angle per antenna design. However, this may vary from tool to tool even though the design processes aim to build the same design. Although a mapping table to map the EM field surrounding an antenna may be used to verify the actual antenna design, the mapping table data may be limited due to antenna dimensions and signal interference for measurements. In addition, the mapping table may not be used to re-verify the antenna. Consequently, residual errors due to any undesired tilt angle may not be captured.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods for determining an actual effective angle of the antennae per tool based on calibration measurements acquired during an air-hang test of the tool. The effective tilt angle (θ') allows for accurate measurements and processing for formation resistivity determinations such as, for example, distance-to-bed boundary inversion.

The tool measurements in the air do not have interference issues observed in a mapping table, and the orientations of all antennae per tool per operating frequency may be determined without mathematical assumptions. Further, the techniques as described herein may be validated by both modeling (e.g., forward modeling code) and real tool measurements.

In particular examples, the orientation of the antennae may be known prior to every processing step. Processing steps may include acquiring measurements from all tilted antennae, each antenna having a known antenna orientation; decoupling multi-component signals from the measurements based on the known antenna orientation; inputting multi-component signals into an inversion process to acquire optimal inverted formation models; and providing the inverted formation models to operations for geo-steering decisions and formation interpretation/evaluation.

In some examples, a designed antenna may include a tilt orientation of 45 degrees relative to a longitudinal axis of the tool. This angle may vary at different operating frequencies even for the identical mechanical design, due to different skin effects. In addition, certain tool variations may be caused by vendors' processes even though the same mechanical design is used.

To determine the orientation of antennas per tool, at least one tilted transmitter and two tilted receiver antennae may be used, in some examples. Also, a mechanically identical design may be used for both of the tilted receivers. A transmitter antenna may include a different design including, for example, a different tilt coil, a different ferrite arrangement underneath the coil, a different mandrel material, and/or different materials used to build the antennae, as long as different effective antenna orientation is acquired because of the design.

Figure 1:
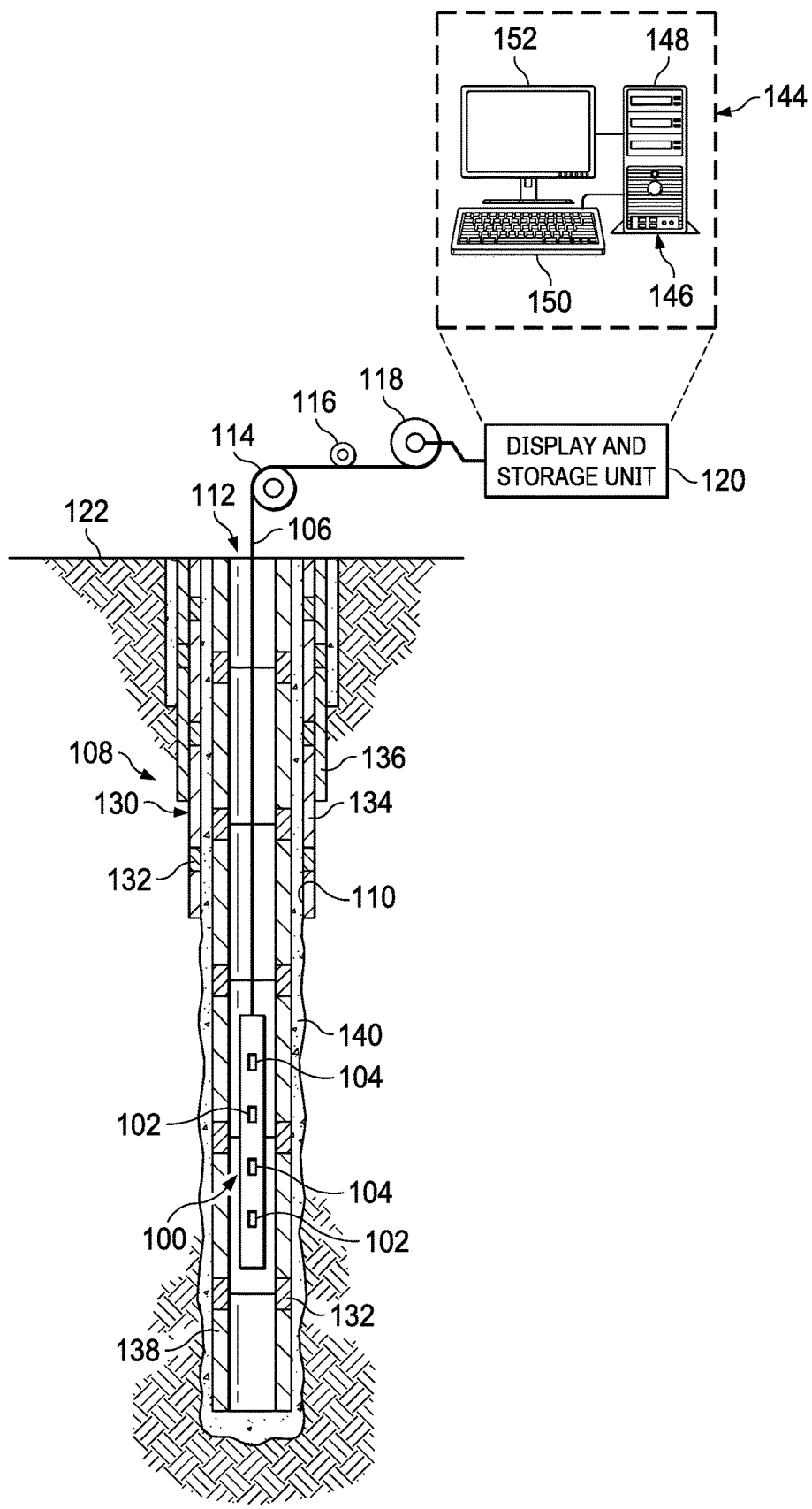
FIG. 1 illustrates a resistivity tool in a wireline configuration, in accordance with examples of the present disclosure.

FIG. 1 illustrates an operating environment for a resistivity tool 100, in accordance with examples of the present disclosure. It should be noted that while FIG. 1 generally depicts a land-based operation, those skilled in the art may recognize that the principles described herein are equally applicable to subsea operations that employ floating or sea-based platforms and rigs, without departing from the scope of the disclosure.

As illustrated, the resistivity tool 100 may include at least one transmitter 102 and at least one receiver 104. Any suitable transmitter and receiver may be employed. The transmitters 102 and the receivers 104 may be disposed along the resistivity tool 100 in any suitable configuration. The resistivity tool 100 may be operatively coupled to a conveyance 106 (e.g., wireline, slickline, coiled tubing, pipe, downhole tractor, and/or the like) which may provide mechanical suspension, as well as electrical connectivity, for the resistivity tool 100. It should be understood that the configuration of resistivity tool 100 shown on FIG. 1 is merely illustrative and other configurations of the resistivity tool 100 may be used with the present techniques.

A conveyance 106 and the resistivity tool 100 may extend within a casing string 108 to a desired depth within the wellbore 110. The conveyance 106, which may include one or more electrical conductors, may exit a wellhead 112, may pass around a pulley 114, may engage an odometer 116, and may be reeled onto a winch 118, which may be employed to raise and lower the resistivity tool 100 in the wellbore 110. Signals recorded by the resistivity tool 100 may be stored on memory and then processed by a display and storage unit 120 after recovery of the resistivity tool 100 from the wellbore 110. Alternatively, signals recorded by the resistivity tool 100 may be transmitted to the display and storage unit 120 by way of the conveyance 106. The display and storage unit 120 may process the signals, and the information contained therein may be displayed for an operator to observe and store for future processing and reference. Alternatively, the signals may be processed downhole prior to receipt by display and storage unit 120 or both downhole and at a surface 122, for example. The display and storage unit 120 may also contain an apparatus for supplying control signals and power to the resistivity tool 100. The casing string 108 may extend from the wellhead 112 at or above ground level to a selected depth within the wellbore 110. The casing string 108 may comprise a plurality of joints 130 or segments of the casing string 108, each joint 130 being connected to the adjacent segments by a collar 132. There may be any number of layers in the casing string 108. For example, the layers may include a first casing 134 and a second casing 136.

FIG. 1 also illustrates a pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. The resistivity tool 100 may be dimensioned so that it may be lowered into the wellbore 110 through the pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between the first casing 134 and the second casing 136.

In logging systems utilizing the resistivity tool 100, a digital telemetry system may be employed, wherein an electrical circuit may be used to both supply power to the resistivity tool 100 and to transfer data between the display and storage unit 120 and the resistivity tool 100. A DC voltage may be provided to the resistivity tool 100 by a power supply located above ground level, and data may be coupled to the DC power conductor by a baseband current pulse system. Alternatively, the resistivity tool 100 may be powered by batteries located within the downhole tool assembly, and/or the data provided by the resistivity tool 100 may be stored within the downhole tool assembly, rather than transmitted to the surface during logging.

In certain examples, operation and function of the resistivity tool 100 may be controlled at the surface 122 by a computer 144. As illustrated, the computer 144 may be a component of the display and storage unit 120. The computer 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the computer 144 may be a personal computer, a network storage device, or any other suitable device and may vary in size, shape, performance, functionality, and price. The computer 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. The non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. At the surface 122, the computer 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with the resistivity tool 100 and/or software executed by processing unit 146. For example, the computer 144 may enable an operator to select analysis options, view collected log data, view analysis results, and/or perform other tasks. In examples, the resistivity tool 100 and the computer 144 may be utilized to measure and process properties (e.g., signals) of a downhole environment.

Figure 2:
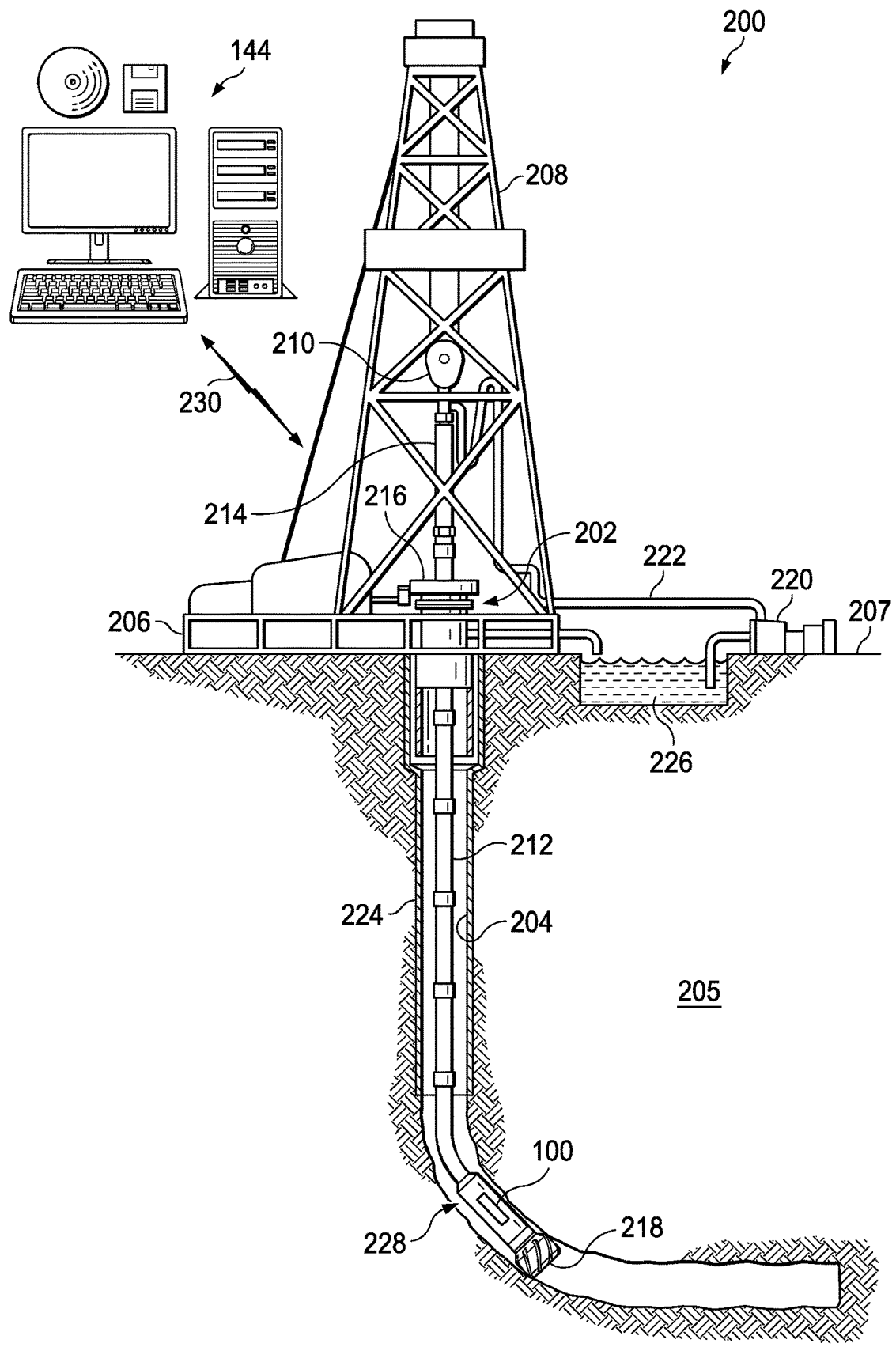
FIG. 2 illustrates a resistivity tool in a drilling configuration, in accordance with examples of the present disclosure.

FIG. 2 illustrates an example of the resistivity tool 100 included in a drilling system 200, in accordance with examples of the present disclosure. It should be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a borehole 204 may extend from a wellhead 202 into a subterranean formation 205 from a surface 207. The borehole 204 may include horizontal, vertical, slanted, curved, and other types of borehole geometries and orientations. A drilling platform 206 may support a derrick 208 having a traveling block 210 for raising and lowering a drill string 212. The drill string 212 may include, but is not limited to, drill pipe and coiled tubing, as generally known to those skilled in the art. A top drive or kelly 214 may support the drill string 212 as it may be lowered through a rotary table 216.

A drill bit 218 may be attached to the distal end of drill string 212 and may be driven either by a downhole motor and/or via rotation of drill string 212 from the surface 207. Without limitation, the drill bit 218 may include roller cone bits, PDC bits, natural diamond bits, any hole openers, reamers, coring bits, and the like. As the drill bit 218 rotates, it may create and extend borehole 204 that penetrates the subterranean formation 205. A pump 220 may circulate drilling fluid through a feed pipe 222 to the kelly 214, downhole through the interior of the drill string 212, through orifices in the drill bit 218, back to the surface 207 via an annulus 224 surrounding the drill string 212, and into a retention pit 226.

The drill string 212 may begin at wellhead 202 and may traverse borehole 204. The drill bit 218 may be attached to a distal end of the drill string 212 and may be driven, for example, either by a downhole motor and/or via rotation of the drill string 212 from the surface 207. The drill bit 218 may be a part of a bottom hole assembly 228 at a distal end of the drill string 212. The bottom hole assembly 228 may include the resistivity tool 100 via threaded connections, for example. As will be appreciated by those of ordinary skill in the art, bottom hole assembly 228 may be a measurement-while drilling (MWD) or logging-while-drilling (LWD) system.

Without limitation, the resistivity tool 100 may be connected to and/or controlled by the computer 144. Processing of information recorded may occur downhole and/or at the surface 207. Data being processed downhole may be transmitted to the surface 207 to be recorded, observed, and/or further analyzed. Additionally, the data may be stored in memory of the resistivity tool 100 while the resistivity tool 100 is disposed downhole.

In some examples, wireless communication may be used to transmit information back and forth between the computer 144 and the resistivity tool 100. The computer 144 may transmit information to the resistivity tool 100 and may receive, as well as process information recorded by the resistivity tool 100. In examples, while not illustrated, the bottom hole assembly 228 may include one or more additional components, such as an analog-to-digital converter, filter and amplifier, among others, that may be used to process the measurements of the resistivity tool 100 before they may be transmitted to the surface 207. Alternatively, raw measurements may be transmitted to the surface 207 from the resistivity tool 100.

Any suitable technique may be used for transmitting signals from the resistivity tool 100 to the surface 207, including, but not limited to, wired pipe telemetry, mud-pulse telemetry, acoustic telemetry, and electromagnetic telemetry. While not illustrated, the bottom hole assembly 228 may include a telemetry subassembly that may transmit telemetry data to the surface 207. Without limitation, an electromagnetic source in the telemetry subassembly may be operable to generate pressure pulses in the drilling fluid that propagate along the fluid stream to the surface 207. At the surface 207, pressure transducers (not shown) may convert the pressure signal into electrical signals for a digitizer (not illustrated). The digitizer may supply a digital form of the telemetry signals to the computer 144 via a communication link 230, which may be a wired or wireless link. The telemetry data may be analyzed and processed by the computer 144. The computer 144 may be employed for orientation determination and calibration of the resistivity tool 100.

Figure 3:
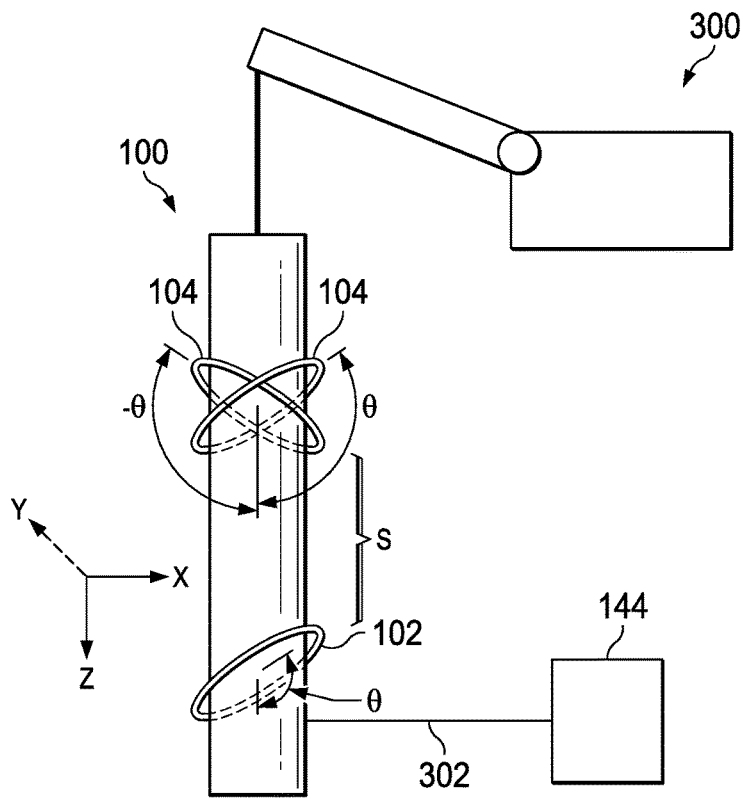
FIGS. 3 and 4 illustrate close-up views of exemplary configurations of the resistivity tool during an air hang calibration, in accordance with examples of the present disclosure.
Figure 4:
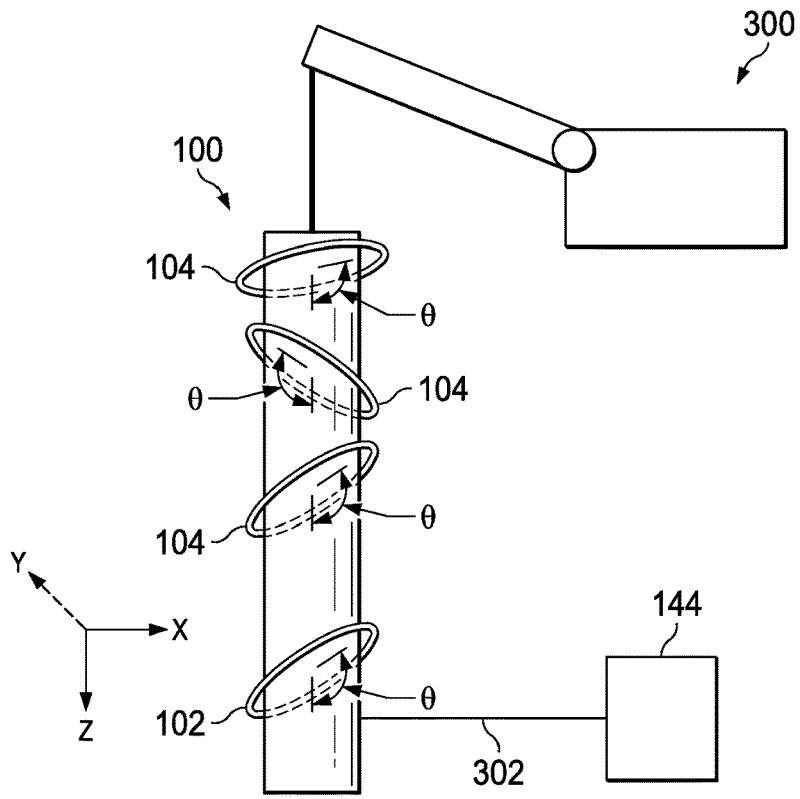

FIGS. 3 and 4 illustrate close-up views of exemplary configurations of the resistivity tool 100 during an air hang calibration, in accordance with some examples of the present disclosure. A crane 300 may hang the resistivity tool 100 in the air for the air hang calibration, as described herein. The resistivity tool 100 may include the transmitter 102 and the receivers 104. In some examples, the transmitter 102 and the receivers 104 may include loop antennae/coils that may be tilted/disposed at an angle (e.g., 45 degrees) relative to a longitudinal axis (e.g., z axis) of the resistivity tool 100. In some examples, the receivers 104 may be collocated (e.g., intersecting loops), as illustrated.

In some examples, the transmitter 102 may be deployed in the air with a physical tilted angle of θ. Two collocated receivers 104 (e.g., shown on FIG. 3) may be deployed in the air a distance S from the transmitter 102 with physical tilted angles of θ and −θ, as shown on FIG. 3.

In some examples, a mechanically identical design may be used for both the receivers 104. The transmitter 102 may include a different design, such as for example, a different tilt coil, different ferrite arrangement underneath the coil, different mandrel material, different materials used to build the antenna, as long as different effective antenna orientations are acquired due to the design.

It should be noted that other configurations may be utilized, such as shown on FIG. 4 which includes three receivers 104 at varying angles/tilts (θ), and a single transmitter 102.

The resistivity tool 100 may be in communication with the computer 144 via a communication path 302 (e.g., wire) for orientation determination and calibration of the resistivity tool 100 during the air hang calibration.

For example, a measurement at a single receiver 104 with respect to a single transmitter 102 firing may be described by Equation 1:

$$V_R^T(\beta) = C_{xx}\cos^2\beta + C_{xy}\cos\beta\sin\beta + C_{xz}\cos\beta + C_{yx}\cos\beta\sin\beta + C_{yy}\sin^2\beta + C_{yz}\sin\beta + C_{zx}\cos\beta + C_{zy}\sin\beta + C_{zz} \quad \text{Eq. (1)}$$

where $$C_{xx}=V_x^x\sin\theta_t\sin\theta_r;\ C_{xy}=V_y^x\sin\theta_t\sin\theta_r;\ C_x^z=V_z^z\sin\theta_t\cos\theta_r$$

$$C_{yx}=V_x^y\sin\theta_t\sin\theta_r;\ C_{yy}=V_y^y\sin\theta_t\sin\theta_r;\ C_y^z=V_y^z\sin\theta_t\cos\theta_r$$

$$C_{zx}=V_x^z\sin\theta_t\sin\theta_r;\ C_{zy}=V_y^z\sin\theta_t\sin\theta_r;\ C_z^z=V_z^z\sin\theta_t\cos\theta_r,$$

β is the tool face angle related to a tool high side, $\theta_t$ is a tilted angle of a transmitter, $\theta_r$ is a tilted angle of a receiver, and $V_j^i$ is a multi-component signal received at a j-oriented antenna with respect to a i-orientated antenna firing (i, j can be in x, y, or z direction). It may be assuming that all three antennas (the transmitter 102 and the two receivers 104) are tilted at an angle θ, meaning $\theta_t=\theta_{r1}=-\theta_{r2}=\theta$, where $\theta_t$ is the tilted angle of the transmitter, $\theta_{r1}$ is the tilted angle of the first receiver and $\theta_{r2}$ is the tilted angle of the second receiver. For receiver measurements in the air, there are only direct coupling components ($V_i^i$, i=x, y or z), no variation of the signal at different tool face angle, and also $V_x^x$ is equal to $V_y^y$. Therefore, the two measurements at the receiver 1 and the receiver 2 in air related to the transmitter firing may be simplified as Equations 2 and 3:

$$V_{R1}^T = V_x^x\cdot(\sin\theta)^2 + V_z^z\cdot(\cos\theta)^2, \text{ and} \quad \text{Eq. (2)}$$

$$V_{R2}^T = -V_x^x\cdot(\sin\theta)^2 + V_z^z\cdot(\cos\theta)^2. \quad \text{Eq. (3)}$$

Manipulation of Equations 2 and 3 may lead to Equations 4 and 5:

$$V_x^x = \frac{V_{R1}^T - V_{R2}^T}{2(\sin\theta)^2} \quad \text{Eq. (4)}$$

$$V_z^z = \frac{V_{R1}^T + V_{R2}^T}{2(\cos\theta)^2} \quad \text{Eq. (5)}$$

Additionally, synthetic responses of $V_x^x$ and $V_z^z$ in the air using different modeling methods such as for example, analytical solutions such as Green's function, numerical solutions from one dimension (1D) to three dimensions (3D), as denoted as $V_{x\ model}^x$ and $V_{z\ model}^z$, respectively. Thus, a scaling factor (SF) may be defined as a ratio between real measurement and modeling as Equations 6 and 7:

$$SF_{xx} = \frac{V_x^x}{V_{x_{model}}^x} = \frac{V_{R1}^T - V_{R2}^T}{2(\sin\theta)^2 \cdot V_{x_{model}}^x} \quad \text{Eq. (6)}$$

$$SF_{zz} = \frac{V_z^z}{V_{z_{model}}^z} = \frac{V_{R1}^T + V_{R2}^T}{2(\cos\theta)^2 \cdot V_{z_{model}}^z} \quad \text{Eq. (7)}$$

The scaling factor for any multi-component signal should be identical. Consequently, based on Equations 6 and 7, Equation 8 may be derived:

$$(\tan\theta)^2 = \frac{\frac{V_{R1}^T - V_{R2}^T}{V_{x_{model}}^x}}{\frac{V_{R1}^T + V_{R2}^T}{V_{z_{model}}^z}} \quad \text{Eq. (8)}$$

In air, the phase part of the measurements may be ignored due to the phase shift from the electronics. Thus, focus may be on the magnitude of the Equation 8 and the tilted angle may be decoupled via Equation 9:

$$\theta = \tan^{-1}\left(\sqrt{\left|\frac{\frac{V_{R1}^T - V_{R2}^T}{V_{x_{model}}^x}}{\frac{V_{R1}^T + V_{R2}^T}{V_{z_{model}}^z}}\right|}\right). \quad \text{Eq. (9)}$$

Figure 5:
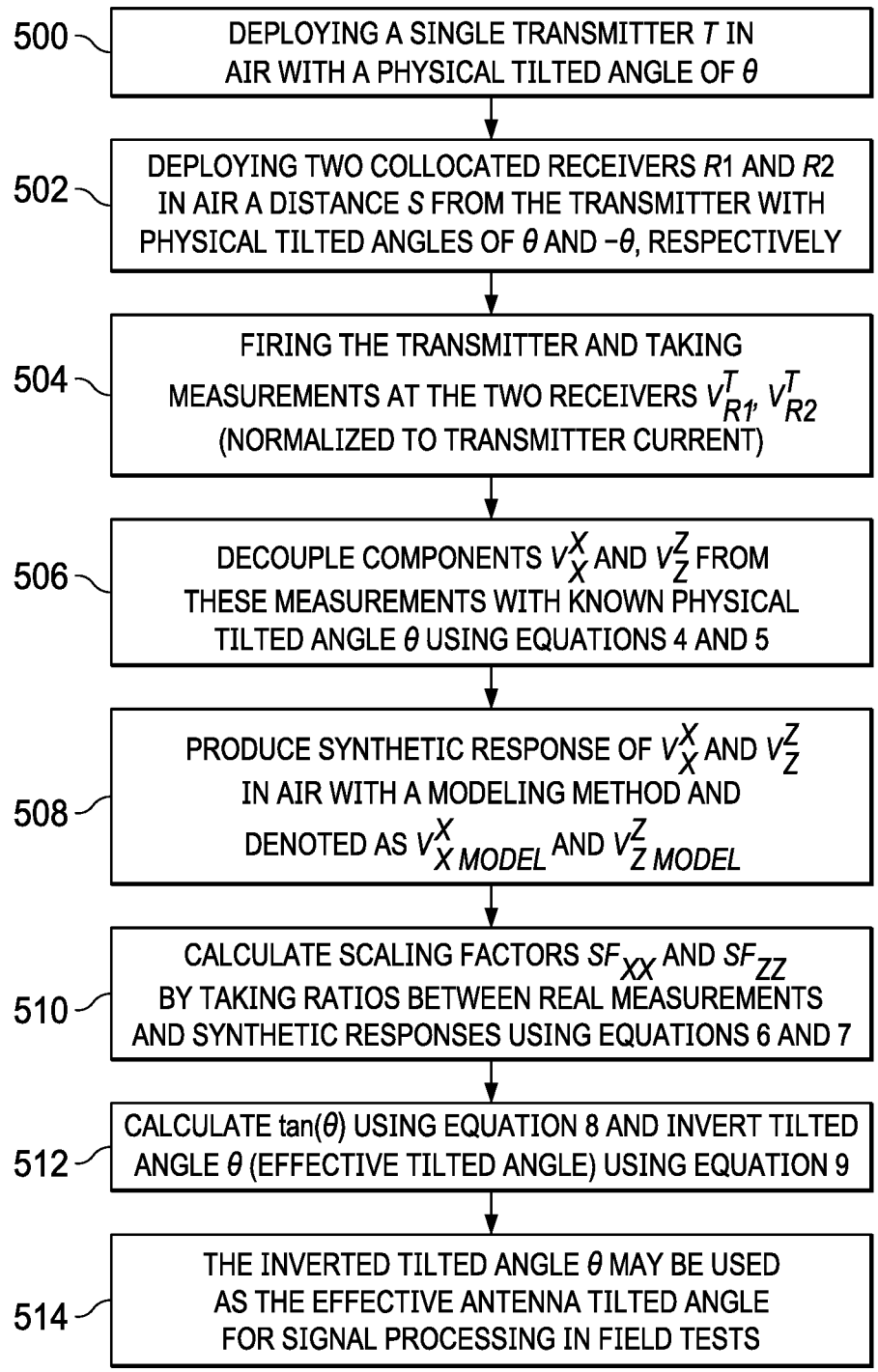
FIG. 5 illustrates a flow chart for determining an effective antenna tilted angle for signal processing during the air hang calibration, in accordance with examples of the present disclosure.

FIG. 5 illustrates a flow chart for determining an effective antenna tilted angle for signal processing during the air hang calibration, in accordance with examples of the present disclosure. At step 500, an EM resistivity logging tool (e.g., the resistivity tool 100 shown on FIGS. 1-4) may be hung in the air for calibration, as shown on FIGS. 3 and 4. For example, a single transmitter 102 (e.g., T) may be deployed in the air with a physical tilted angle of θ.

At step 502 two collocated receivers 104 (e.g., R1 and R2) may be deployed in the air a distance S from the transmitter with physical tilted angles of θ and −θ, respectively. At step 504, the transmitter may be fired (e.g., transmit signals) and the signals may be measured/received at the two receivers 104 (e.g., $V_{R1}^T$, $V_{R2}^T$) (normalized to transmitter current). In some examples, measurements may be combined at the two receivers with respect to the transmitter signal in a known formation. Combining may include adding and subtracting between two pairs to acquire two measurements. In some examples, the transmitter and receiver are exchangeable due to the antenna reciprocity. For example, two transmitters and one receiver may be employed.

At step 506, components $V_x^x$ and $V_z^z$ may be decoupled from these measurements with known physical tilted angle θ using Equations 4 and 5. At step 508, a synthetic response of $V_x^x$ and $V_z^z$ may be produced in the air with a modeling method and denoted as $V_{x\ model}^x$ and $V_{z\ model}^z$.

At step 510, scaling factors $SF_{xx}$ and $SF_{zz}$ may be calculated by taking ratios between real measurements and synthetic responses using Equations 6 and 7. At step 512, tan(θ) may be calculated using Equation 8. The tilted angle θ (effective tilted angle) may be inverted using Equation 9. At step 514, the inverted tilted angle θ may be used as the effective antenna tilted angle for signal processing in field tests.

In some examples, orientation of a designed antenna may be identified in 1D and/or 3D numerical modeling software (e.g., stratified layer model). To verify concepts as described herein, Table 1 shows two different antenna designs, and a simulated effective antenna orientation of each design at different operating frequencies.

TABLE 1

Effective Antenna Orientations of Two Different Antenna Designs at Different Operating Frequencies.

| Frequency (Kilohertz) | Design 1 | Design 2 |
|---|---|---|
| 2 | 47.9° | 43.9° |
| 4 | 48.4° | 43.2° |
| 8 | 47.0° | 41.6° |
| 16 | 45.7° | 40.3° |
| 32 | 44.7° | 39.4° |

The simulated responses may be treated as real tool responses denoted as $V_{R1\ 3D}^D$ and $V_{R2\ 3D}^T$. Additionally, 1D modeling responses for $V_x^x$ and $V_z^z$ in the air, denoted as $V_{x\ 1D}^x$ and $V_{z\ 1D}^z$, respectively, may be acquired. The antenna orientation for each design at a particular frequency may be calculated via Equation 9 and Equation 10:

$$\theta = \tan^{-1}\left(\sqrt{\left|\frac{\frac{V_{R1_{3D}}^T - V_{R2_{3D}}^T}{V_{x_{1D}}^x}}{\frac{V_{R1_{3D}}^T + V_{R2_{3D}}^T}{V_{z_{1D}}^z}}\right|}\right). \quad \text{Eq. (10)}$$

The calculated tilted angles and the corresponding model-designed angles may be found in Tables 2 and 3.

TABLE 2

Calculated Tilt Angles and Model-Designed Angles for Design 1.

| Frequency (Kilohertz) | Calculated Tilt Angle | Model-Designed Angles |
|---|---|---|
| 2 | 48.1° | 47.9° |
| 4 | 48.6° | 48.4° |
| 8 | 47.2° | 47.0° |
| 16 | 45.9° | 45.7° |
| 32 | 44.9° | 44.7° |

TABLE 3

Calculated Tilt Angles and Model-Designee Angles for Design 2.

| Frequency (Kilohertz) | Calculated Tilt Angle | Model-Designed Angles |
|---|---|---|
| 2 | 44.1° | 43.9° |
| 4 | 43.4° | 43.2° |
| 8 | 41.8° | 41.6° |
| 16 | 40.5° | 40.3° |
| 32 | 39.6° | 39.4° |

Figure 6:
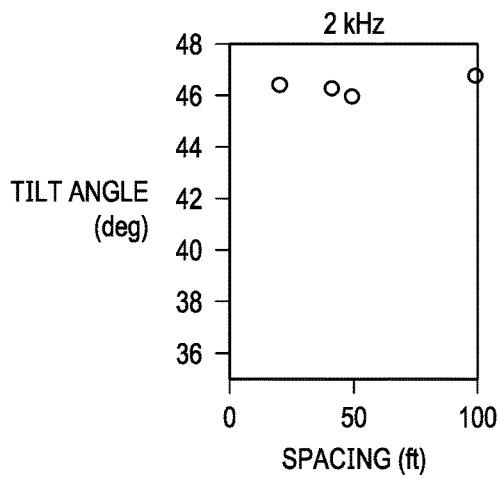
FIGS. 6-10 illustrate antenna orientations at different operating frequencies, in accordance with examples of the present disclosure.
Figure 7:
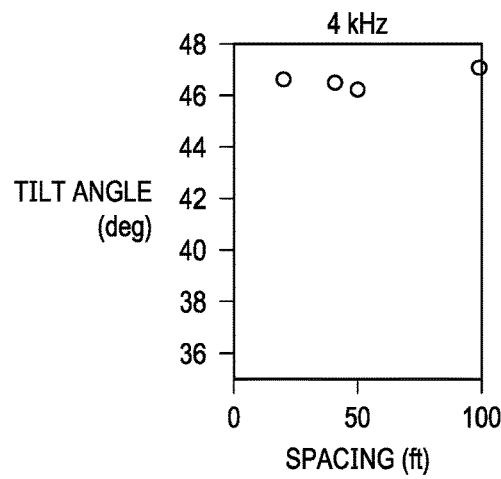
Figure 8:
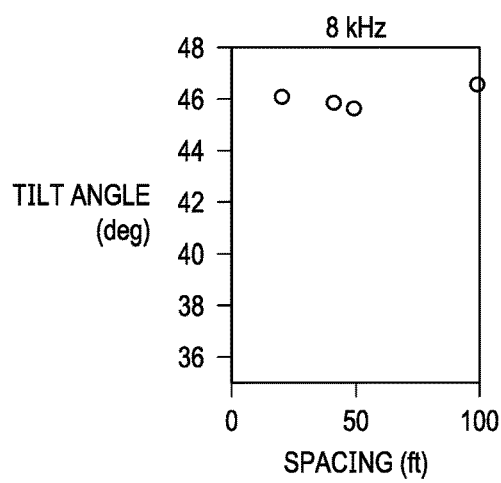
Figure 9:
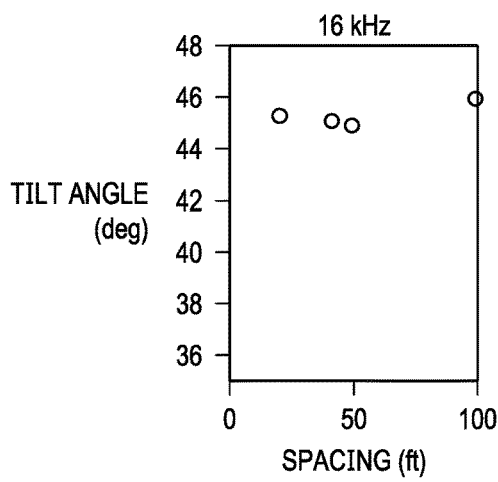
Figure 10:
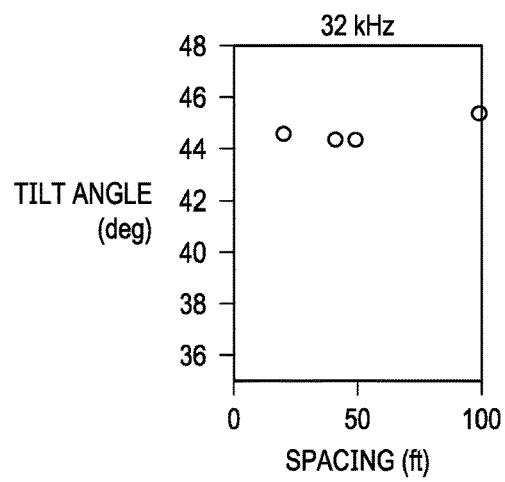

FIGS. 6-10 illustrate antenna orientations calculated based on Equation 9 for each antenna spacing (e.g., a distance from a transmitter antenna to a receiver antenna) at each operating frequency, in accordance with examples of the present disclosure. FIG. 6 illustrates calculated antenna orientation at 2 kHz. FIG. 7 illustrates calculated antenna orientation at 4 kHz. FIG. 8 illustrates calculated antenna orientation at 8 kHz. FIG. 9 illustrates calculated antenna orientation at 16 kHz. FIG. 10 illustrates calculated antenna orientation at 32 kHz. Table 4 averages the calculated effective angle among all spacings between transmitter and receivers to summarize the effective angle variation at different operating frequencies.

TABLE 4

Summary Table of Average Effective Antenna
Orientations in FIGS. 6-10.

| Frequency (Kilohertz) | Effective Angle from Real Tool Design Based On Big Crane Air-Hang Data |
|---|---|
| 2 | 46.3° |
| 4 | 46.5° |
| 8 | 45.9° |
| 16 | 45.2° |
| 32 | 44.6° |

Accordingly, the systems and methods of the present disclosure allow for determining an actual effective angle of the antennae per tool based on calibration measurements acquired during an air-hang test of an EM resistivity tool. The effective tilt angle allows for accurate measurements and processing for formation resistivity determinations such as, for example, distance-to-bed boundary inversion. The systems and methods may include any of the various features disclosed herein, including one or more of the following statements.

Statement 1. A method to calibrate a resistivity logging tool, comprising: deploying a transmitter of the resistivity logging tool in a known formation with a known resistivity property with a physical tilted angle θ relative to a longitudinal axis of the resistivity logging tool; deploying receivers in the known formation, wherein a physical tilted angle of a first receiver is θ relative to the longitudinal axis of the resistivity logging tool, and wherein a physical tilted angle of a second receiver is −θ, relative to the longitudinal axis of the resistivity logging tool; transmitting signals with the transmitter and measuring the signals at the receivers; combining measurements at two receivers with respect to a transmitter signal in the known formation; producing synthetic responses of the resistivity logging tool in the known formation using forward modeling; and calculating an effective tilted angle θ' from real measurements and the synthetic responses, wherein θ' is not the same angle value as θ; and using the effective titled angle θ' to calibrate tool measurements in unknown formation properties.

Statement 2. The method of the statement 1, wherein the deploying the transmitter in the known formation comprises deploying the transmitter in the air.

Statement 3. The method of the statement 1 or the statement 2, wherein the deploying the receivers in the known formation comprises deploying collocated receivers in the known formation.

Statement 4. The method of any one of the statements 1-3, wherein the deploying the receivers comprises deploying two collocated receivers in the known formation.

Statement 5. The method of any one of the statements 1-4, further comprising deploying the transmitter in the known formation with a crane, wherein the known formation is air.

Statement 6. The method of any one of the statements 1-5, wherein the producing the synthetic responses in the known formation with modeling comprises producing the synthetic responses in the known formation with numerical modeling software.

Statement 7. The method of any one of the statements 1-6, further comprising producing the synthetic responses with numerical modeling software comprising a one-dimensional, two-dimensional, or three-dimensional modeling software.

Statement 8. The method of any one of the statements 1-7, wherein the deploying the transmitter of the resistivity logging tool in the known formation comprises deploying the transmitter in the known formation with a physical tilted angle θ.

Statement 9. The method of any one of the statements 1-8, further comprising calculating scaling factors with ratios between real measurements and the synthetic responses.

Statement 10. The method of any one of the statements 1-9, further comprising deploying the receivers in the known formation with a crane, wherein the known formation is air.

Statement 11. The method of any one of the statements 1-10, further comprising deploying a third receiver in the known formation, wherein a tilted angle of the third receiver or an azimuthal angle of the third receiver is different than those of the first and second receivers.

Statement 12. A system for calibrating a resistivity logging tool, comprising: a transmitter with a physical tilted angle θ relative to a longitudinal axis of the resistivity logging tool; a first receiver with a physical tilted angle θ relative to the longitudinal axis of the resistivity logging tool; a second receiver with a physical tilted angle −θ relative to the longitudinal axis of the resistivity logging tool; and a computer operable to: combine measurements at the receivers with respect to a transmitter signal in a known formation; produce synthetic responses in the known formation with forward modeling; and calculate an effective tilted θ' from real measurements and the synthetic responses, wherein θ' is not the same angle value as θ.

Statement 13. The system of the statement 12, wherein the computer is further operable to produce synthetic responses in the known formation with numerical modeling software.

Statement 14. The system of the statement 12 or the statement 13, wherein the computer is further operable to calculate scaling factors with ratios between real measurements and the synthetic responses.

Statement 15. The system of any one of the statements 12-14, further comprising a third receiver in the known formation, wherein a tilted angle of the third receiver or an azimuthal angle of the third receiver is different than those of the first and second receivers.

Statement 16. The system of any one of the statements 12-15, wherein the transmitter is disposed in the known formation.

Statement 17. The system of any one of the statements 12-16, wherein the receivers are disposed in the known formation.

Statement 18. The system of any one of the statements 12-17, wherein the transmitter and the receivers hang from a crane.

Statement 19. The system of any one of the statements 12-18, wherein the transmitter is disposed in the air.

Statement 20. The system of any one of the statements 12-19, wherein the receivers are disposed in the air.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method to calibrate a resistivity logging tool, comprising:
    deploying a transmitter of the resistivity logging tool in a known formation with a known resistivity property with a physical tilted angle $\theta$ relative to a longitudinal axis of the resistivity logging tool;
    deploying receivers in the known formation, wherein a physical tilted angle of a first receiver is $\theta$ relative to the longitudinal axis of the resistivity logging tool, and wherein a physical tilted angle of a second receiver is $-\theta$, relative to the longitudinal axis of the resistivity logging tool;
    transmitting signals with the transmitter and measuring the signals at the receivers;
    combining measurements at two receivers with respect to a transmitter signal in the known formation;
    producing synthetic responses of the resistivity logging tool in the known formation using forward modeling; and
    calculating an effective tilted angle $\theta'$ from real measurements and the synthetic responses, wherein $\theta'$ has a different same angle value than $\theta$; and
    using the effective tilted angle $\theta'$ to calibrate tool measurements with unknown formation properties.

2. The method of claim 1, wherein deploying the transmitter in the known formation comprises deploying the transmitter in air.

3. The method of claim 1, wherein deploying the receivers in the known formation comprises deploying collocated receivers in the known formation.

4. The method of claim 1, wherein deploying the receivers comprises deploying two collocated receivers in the known formation.

5. The method of claim 1, further comprising deploying the transmitter in the known formation with a crane, wherein the known formation is air.

6. The method of claim 1, wherein producing the synthetic responses in the known formation using forward modeling comprises producing the synthetic responses in the known formation with numerical modeling software.

7. The method of claim 1, further comprising producing the synthetic responses with numerical modeling software comprising a one-dimensional, two-dimensional, or three-dimensional modeling software.

8. The method of claim 1, wherein deploying the transmitter of the resistivity logging tool in the known formation comprises deploying the transmitter in the known formation with a physical tilted angle $\theta$.

9. The method of claim 1, further comprising calculating scaling factors with ratios between real measurements and the synthetic responses.

10. The method of claim 1, further comprising deploying the receivers in the known formation with a crane, wherein the known formation is air.

11. The method of claim 1, further comprising deploying a third receiver in the known formation, wherein a tilted angle of the third receiver or an azimuthal angle of the third receiver is different than those of the first receiver and the second receivers.

12. A system for calibrating a resistivity logging tool, comprising:
    a transmitter with a physical tilted angle $\theta$ relative to a longitudinal axis of the resistivity logging tool;
    a first receiver with a physical tilted angle $\theta$ relative to the longitudinal axis of the resistivity logging tool;
    a second receiver with a physical tilted angle $-\theta$ relative to the longitudinal axis of the resistivity logging tool; and
    a computer operable to:
        combine measurements of the first receivers and the second receiver with respect to a transmitter signal in a known formation;
        produce synthetic responses in the known formation with forward modeling; and
        calculate an effective tilted $\theta'$ from real measurements and the synthetic responses, wherein $\theta'$ has a different angle value than $\theta$.

13. The system of claim 12, wherein the computer is further operable to produce the synthetic responses in the known formation with numerical modeling software.

14. The system of claim 12, wherein the computer is further operable to calculate scaling factors with ratios between real measurements and the synthetic responses.

15. The system of claim 12, further comprising a third receiver in the known formation, wherein a tilted angle of the third receiver or an azimuthal angle of the third receiver is different than those of the first receiver and the second receivers.

16. The system of claim 12, wherein the transmitter is disposed in the known formation.

17. The system of claim 12, wherein the first receivers and the second receiver are disposed in the known formation.

18. The system of claim 12, wherein the transmitter and the first receivers and the second receiver hang from a crane.

19. The system of claim 12, wherein the transmitter is disposed in air.

20. The system of claim 12, wherein the first receiver and the second receiver are disposed in air.

\* \* \* \* \*